March 1, 1966 S. KRONENBERG 3,238,369
FAST NEUTRON SPECTROSCOPE FOR MEASUREMENTS IN A HIGH
INTENSITY TIME DEPENDENT NEUTRON ENVIRONMENT
Filed Sept. 26, 1962 2 Sheets-Sheet 1
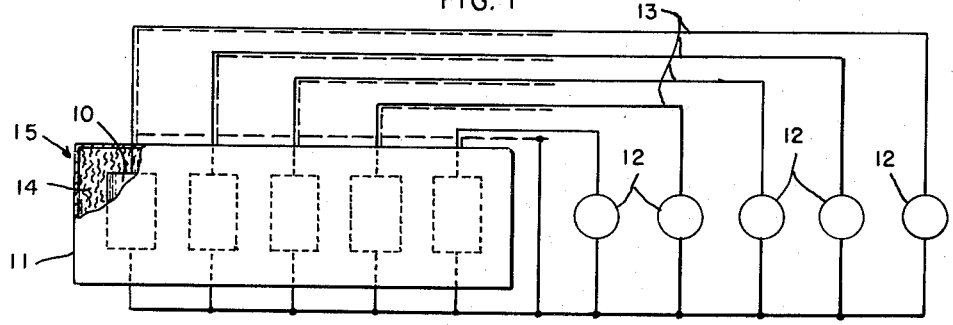
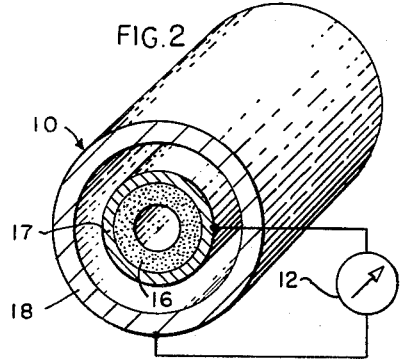
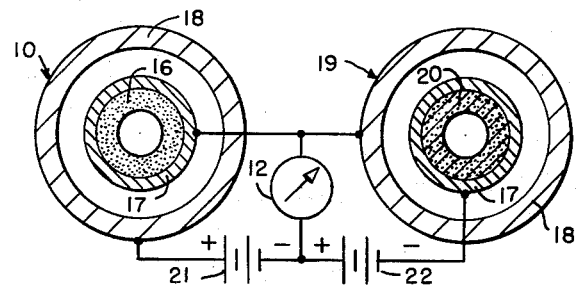
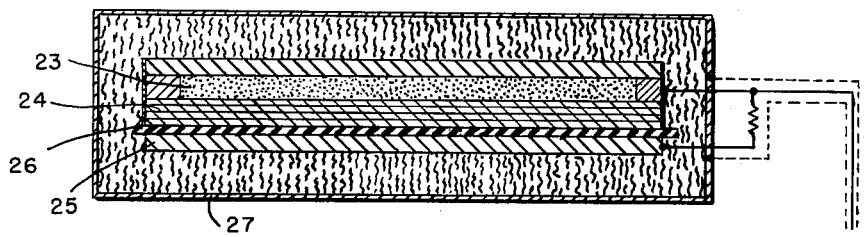
INVENTOR,
STANLEY KRONENBERG
BY Harry M. Saragovitz
ATTORNEY, March 1, 1966
S. KRONENBERG
3,238,369
FAST NEUTRON SPECTROSCOPE FOR MEASUREMENTS IN A HIGH
INTENSITY TIME DEPENDENT NEUTRON ENVIRONMENT
Filed Sept. 26, 1962
2 Sheets-Sheet 2
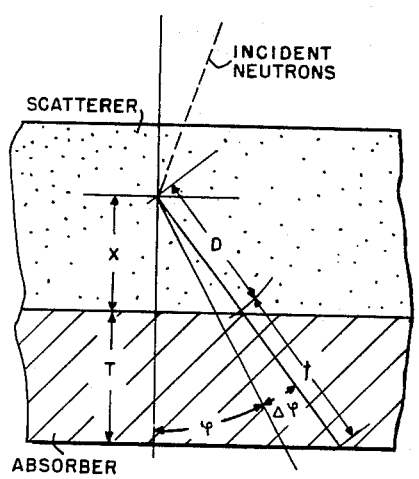
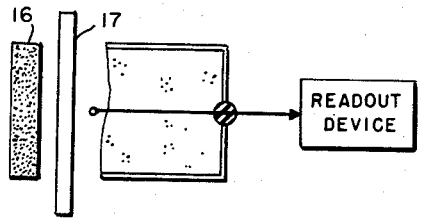
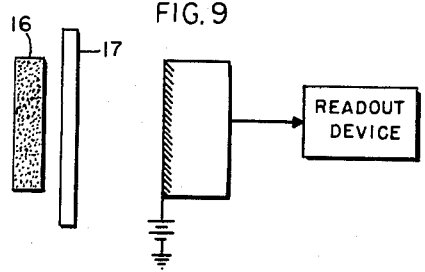
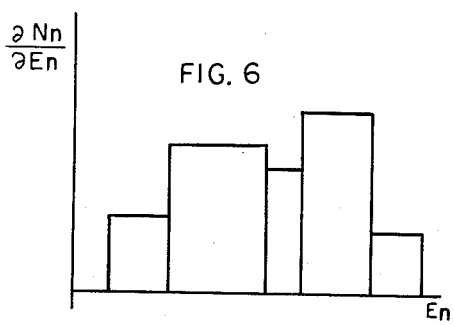
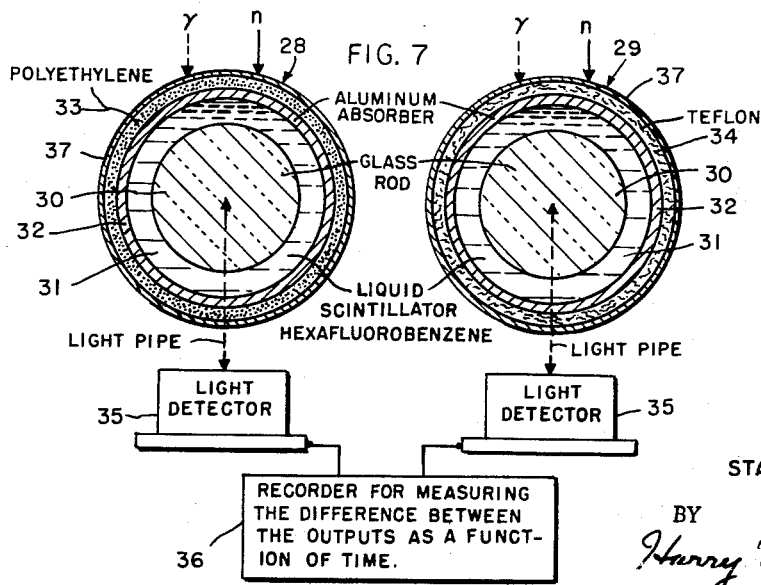
INVENTOR,
STANLEY KRONENBERG
BY
Harry M. Saragovitz
ATTORNEY.

United States Patent Office

3,238,369
Patented Mar. 1, 1966

3,238,369
FAST NEUTRON SPECTROSCOPE FOR MEASUREMENTS IN A HIGH INTENSITY TIME DEPENDENT NEUTRON ENVIRONMENT
Stanley Kronenberg, Skillman, N.J., assignor to the United States of America as represented by the Secretary of the Army
Filed Sept. 26, 1962, Ser. No. 226,788
12 Claims. (Cl. 250—83.1)
(Granted under Title 35, U.S. Code (1952), sec. 266)

The invention described herein may be manufactured and used by or for the Government for governmental purposes, without the payment of any royalty thereon.

The invention relates to a system for use in radiation research to determine time dependent spectra as a function of time with high time resolution and includes a neutron spectroscope which provides data having a mathematical relationship to the desired neutron energy spectrum as a function of time for the neutron environment to be explored.

As will appear hereinafter the apparatus of the invention can cover neutron intensities ranging from $10^{26}$ to $10^2$ neutrons cm.$^{-2}$ sec.$^{-1}$ and can provide the spectrum as a function of time with a resolution of $10^{-9}$ sec. The apparatus may be made insensitive to gamma radiation by output compensation, making it operative in mixed gamma and neutron environment.

In modern research relating to pulsed reactors, atomic weapons, and other nuclear radiation sources it is important to know the spectrum of fast neutrons in the environment of the source and how this spectrum varies with time during and after the pulse at different distances from the source. Neutron spectroscopy as a function of time using techniques of the single particle energy analysis can not be applied because at high intensities it is not possible to resolve the single particles.

The apparatus of the invention operates on the collective contribution of particles scattered by fast neutrons. A basic form of the apparatus is capable of measuring neutron spectra between the energies of several hundred kev. and several tens mev. when the neutrons are delivered at a rate between $10^{26}$ and $10^{16}$ neutrons cm.$^{-2}$ sec.$^{-1}$. The apparatus can be modified to function at flux intensities between $10^{16}$ and $10^9$ neutrons cm.$^{-2}$ sec.$^{-1}$ and for $10^9$ to $10^2$ neutrons cm.$^{-2}$ sec.$^{-1}$.

To use the spectroscope it is set up at a desired distance from the source and readings are taken from the readout devices on the spectroscope. These readings provide data from which the energy distribution within the environment at any desired instant throughout the duration of the environment may be computed. It is apparent that a complete exploration of the history of the neutron energy distribution of the environment may be made or that a measurement at one predetermined time may be made.

A determination of the energy spectrum such as above indicated has not heretofore been possible in the intensity ranges above stated.

The apparatus of the invention consists of several similar elements having independent readouts. The elements are placed close together in the neutron environment. Each element of the spectroscope consists of an hydrogenous recoil portion scatterer which is thicker than the range of a proton with an energy corresponding to the highest neutron energy in the environment but much thinner than the mean free path of the neutrons in the scattering material being investigated. The scatterer is surrounded by an absorber made of an homogenous material of uniform thickness. The purpose of the absorber is to reduce, depending on its thickness, the energy and the number of recoil protons escaping from the surface of the scatterer. The Z of this material must be much higher than 1 so that its recoils have a negligibly small chance of escaping through its surface, since heavy recoils have a short range as compared with protons and since the energy of transfer between a neutron and a high Z recoil is small. Pure aluminum can be considered a suitable absorber material. The absorber thickness is different for each of the elements of the spectroscope and the maximum absorber thickness is chosen so that none of the recoil protons can penetrate it. The absorber is surrounded by a detector with an effectively $4\pi$ geometry. The same kind of detector is used for each one of the elements, and its design depends on the neutron intensity range in which we expect the instrument to function.

For the highest neutron intensities $10^{26}$ to $10^{16}$ neutrons cm.$^{-2}$ sec.$^{-1}$ the detector should measure the total number of protons which arrive at its surface as a function of time. Since the recoil protons carry an electric charge this can be accomplished for example by surrounding the absorber with a block of metal which is electrically insulated from the absorber and whose thickness is sufficient to absorb all protons reaching it. Vacuum or a thin layer of non-hydrogenous material can be used as the insulator. The electric current as a function of time measured between the absorber layer and the detector is then proportional to the proton flux as a function of time.

For intermediate neutron intensities $10^{16}$ to $10^9$ neutrons cm.$^{-2}$ sec.$^{-1}$ the detector should have an output proportional to the total energy of the recoil protons delivered as a function of time. Many different detector designs are applicable here and some are as follows: (a) surrounding the absorber with a non-hydrogenous phosphor and measuring its light output as a function of time, (b) surrounding the absorber with a gas and measuring the ionization current as a function of time and (c) using solid state detectors. In all cases the output is proportional to the total energy delivered to the detector as a function of time.

For low intensities $10^9$ to $10^2$ neutrons cm.$^{-2}$ sec.$^{-1}$, the total number of recoils escaping from the absorber as a function of time should be measured in the same way as in the case of the very high neutron intensities except that here the escaping protons should be counted individually rather than their current measured. To do this, one can use the following; solid state counters (silicon diodes), scintillation counting methods, and assemblies in which the absorber is inserted as a central lead in a Geiger-Mueller counter tube. It should be emphasized that only the counting rate of protons matters here; the measurement of their energy distribution is not necessary.

In all versions of the spectroscope it is important that the detector does not interact directly with the neutrons, or that the signal obtained from the direct interaction is much weaker than from the recoil protons escaping through the absorber.

Since the measured electric current as a function of time is proportional either to the rate with which the recoil protons are delivered to the detector or to the total energy delivery rate by the recoil protons to the detector, knowledge of the current output measured as a function of time enables one to obtain the spectrum of the neutrons incident on the detector as a function of time using the mathematical expressions subsequently derived in the following paragraphs. The neutron spectrum so obtained will be in the form of a histogram with a constant or variable width of the intervals as desired. The number of intervals of the histogram, which gives the spectral resolution will be equal to the number of elements used in the spectrometer. A typical histogram derived from the procedure herein set forth is shown in FIG. 6.

A primary object of the invention is to provide a system for determining the energy distribution spectrum of a fast neutron environment as a function of time.

A further object of the invention is to provide a system for measuring time dependent spectra in a wide range, high intensity environment such as that in close proximity to a nuclear reactor.

A further object of the invention is to provide a system for measuring time dependent spectra in a wide range, discriminates against gamma rays in a mixed environment of neutrons and gamma rays.

Other objects and features of the invention will more fully appear from the following description and will be particularly pointed out in the claims.

To provide a better understanding of the invention particular embodiments thereof will be described and illustrated in the accompanying drawings wherein:

FIG. 1 is a diagrammatic view of a system embodying the invention.

FIG. 2 is a cross sectional view of a measuring unit embodied in the system.

FIG. 3 is a cross sectional view of a modified construction for a measuring unit.

FIG. 4 is a cross sectional view of a measuring unit whose elements are of planar conformation.

FIG. 5 is a diagrammatic illustration of the paths of incident neutrons and recoil protons in the materials used in the apparatus of the invention.

FIG. 6 is a histogram representing the neutron energy spectrum of a neutron environment.

FIG. 7 shows one element of the gamma compensating spectroscope for use in the intermediate intensity range which performs on the scintillator principle.

FIG. 8 is a diagrammatic view of one element of a form of the invention wherein the detecting means is an ionization chamber.

FIG. 9 is a diagrammatic view of one element of a form of the invention in which a solid state detecting means is used.

The invention includes a plurality of similar elements 10. These elements are disposed in close formation within a container 11. Each element is connected remotely or otherwise to readout devices 12 through suitable cables such as coaxial transmission lines 13. Desirably the elements 10 are potted within the container 11 with a suitable compound 14. By so doing ionization effects in the air surrounding the units 10 are suppressed. The assembly 15 is placed within the environment to be explored.

The function and structure of each element is similar. Their difference resides in the different thickness of individual absorber elements. The data recorded on the respective readout devices at each particular instant of time is used to calculate, in a manner to be set forth, the height of the intervals of a histogram representing the complete neutron energy spectrum for this instant of time. Doing this for different times one obtains the spectrum as a function of time.

Any suitable geometrical form may be adopted for the units 10. A satisfactory configuration has been found to be a cylinder. When a configuration approximating $4\pi$ is used the device will operate in a neutron environment with isotropic as well as monodirectional incidence.

The detector unit 10 shown in FIG. 2 is composed of an inner cylindrical member 16 which will be termed the scatterer made of hydrogenous material such as polyethylene. This member is made in hollow cylindrical form having walls of a specific thickness which as stated above must be thicker than the range of a proton with an energy corresponding to the highest neutron energy, but much thinner than the mean free path of the neutrons being investigated in the environment. The scatterer 16 is surrounded by an element to be termed an absorber 17 of non-hydrogenous material. Aluminum has been found to be a satisfactory material. Each absorber must be of uniform thickness and be capable of reducing the number and the energy of recoil protons released by the scatterer.

The absorber thickness is different for each unit 10. The maximum thickness of the absorber as above stated is chosen to prevent penetration of all protons therethrough. The absorber is surrounded by a detector member 18. The detectors for each of the units 10 are of the same construction and their design depends upon the neutron intensity range in which the system is to function.

To measure the neutron spectrum in a mixed neutron gamma environment, the spectroscope should be insensitive to gamma rays. In the device above described in a mixed neutron and gamma environment the incident gamma rays produce a signal which contributes to the signal from the recoil protons and thus distort the measurement of the desired neutron spectrum. For devices operating in the maximum and intermediate neutron intensity environment containing gamma rays a compensation method may be used. In this case each detector in the apparatus must be constructed as a double unit. Such a unit is shown in FIG. 3. One portion of the double unit is similar to the units 10 above described and the other portion 19 of the pair is constructed with the same geometry and differs only in that the hydrogenous material 16 is replaced by a non-hydrogenous material preferably carbon in the form of pure graphite or Teflon. The wall thickness of the element 20 must be chosen to provide absorption for gamma rays and electrons and for its capability for fast electron production from gamma rays to be the same as that for the hydrogenous element 16. The outputs of both units 10 and 19 caused by gamma radiation are then almost equal and by connecting the two outputs in a manner to oppose each other as shown in FIG. 3 the system becomes to a high degree gamma insensitive.

Several of these double devices are used in the manner illustrated in FIG. 1 to provide the required data to construct a histogram for the total time dependent neutron spectrum as a function of time under investigation and such data will be substantially free from the influence of gamma rays.

FIG. 4 of the drawings illustrates a planar structure for the elements of the apparatus. This device functions in the same manner as the elements 10 above described except that it has directional limitations due to its flat conformation. Only radiation arriving from above the plane of the scatterer 23 is measured. An absorber 24 is arranged below the scatterer and below that is a detector 25 which is insulated from the absorber 24 by a thin sheet of insulation 26 made of material such as Teflon.

The absorber 24 may be made of a plurality of thin aluminum sheets which provides a convenient means for establishing its effective thickness. Electrical connections are made from the absorber and detector to a readout device. The assembled element is potted in suitable compound and enclosed in a protective casing 27. Several of these elements each having absorbers of different thicknesses are connected in the manner shown in FIG. 1 to separate readout devices.

FIG. 7 in the drawings illustrates diagrammatically a different construction for elements of a spectroscope which is insensitive to gamma rays in an environment containing neutrons and gamma rays. In this device the detector is a non-hydrogenous scintillator coupled to a light detector. The light from the scintillators is fed to light detecting devices the outputs of which are proportional to total energy of the recoil protons passing through the absorbers as a function of time. The output data from several of such elements supply data from which the neutron spectrum may be calculated.

Each element of the spectroscope is composed of two units 28 and 29. Both units are of cylindrical construction and consist of a central glass rod 30. The rods in each unit are surrounded by liquid scintillators 31. Outside of the scintillators are absorbers 32. In the unit 28 a scatterer 33 of polyethylene is formed and in the unit 29 a uniform layer 34 of non-hydrogenous material such as Teflon is formed outside the absorber. The scintillators consist of a quantity of hexafluorobenzene with additives. The light generated in the scintillator is piped through the rods 30 to light detectors 35.

In this apparatus as in that shown in FIG. 3 the dimensions of the components in the units 28 and 29 are chosen so that the outputs thereof due to incident gamma rays are substantially equal. The output from the unit 28 equals that resulting from neutrons, gamma rays and other particles while that from the unit 29 is due to gamma rays and other particles but not neutrons. The two outputs are fed to a recording system 36 in which the difference between them is measured. This measurement supplies the desired data as in the other forms of the invention described. The units 28 and 29 are enclosed in aluminum casing 37.

A mathematic analysis has been derived whereby the readings upon the readout devices 12 are used to calculate the actual neutron energy spectrum as a function of time within the environment investigated. The mathematics are set forth below.

If a proton at rest is struck by a neutron of energy $E_n$, the proton after collision has the energy given by $E_n \cos^2 \rho$ where $\rho$ is the angle between the original neutron velocity and the recoil proton velocity. Reference to FIG. 5 is suggested.

For the energy loss of these recoils in the traversed material, one can make the semi-empirical assumption:

$$\frac{dE_p}{dX_H} = -K_H E_p{}^{\delta H} \quad (1A)$$

$$\frac{dE_p}{dX_{Ab}} = -K_{Ab} E_p{}^{\delta Ab} \quad (1B)$$

where $E_p$ is the proton energy
$K_{Ab}$, $\delta Ab$ material constants of the absorber
$K_H$, $\delta H$ material constants of the hydrogenous material When we consider aluminum and polyethylene as the absorber and scatterer material respectively and express the material thickness X in g. cm.$^{-2}$ rather than in centimeters, then $$K_{Ab} = K_H = K$$

and $$\delta_{Ab} = \delta_H = \delta$$

Integrating equation 1A we find that a recoil proton with initial energy $E_0$ after traveling a distance D in the scatterer has the remaining energy $E_1$ given by $$\frac{E_0{}^{1-\delta} - E_1{}^{1-\delta}}{K(1-\delta)} = D \quad (2)$$

In an analogous way, a proton which enters the absorber with the energy $E_1$ and travels the distance $t_1$ has the remaining energy E given by $$\frac{E_1{}^{1-\delta} - E^{1-\delta}}{K(1-\delta)} = t \quad (2B)$$

From 2A and 2B we see that the energy with which a proton enters the detector after passing through the absorber and the scatterer is given by $$\frac{E_0{}^{1-\delta} - E^{1-\delta}}{K(1-\delta)} = D + t \quad (3)$$

We assume now that protons of a single energy $E_0$ are generated uniformly and isotropically throughout the irradiated slab.

If $N_0$ is the total proton activity, then $$dN_0 = n dX$$

where n is the specific proton activity (number of protons generated per sec. in 1 g. cm.$^{-2}$ of the material).

The number of protons in the solid angle defined in FIG. 5 by $\rho$ and $\rho + \rho d$ is $$1/2 n dX \sin \rho d\rho \quad (4)$$

If a proton whose original energy was $E_0$ is to emerge through $D+t$ with an energy greater than E then the maximum value for $D+t$ is given by Equation 3. Consequently $\rho$ cannot exceed arc cos $$\frac{X+T}{D+t}$$

and the total number of protons which emerge from the absorber with energy greater than E and originate between x and $x+dx$ is given by $$-\int_0^{\rho \max.} \frac{1}{2} nd(X+T) \sin \rho d\rho$$

$$= -\frac{1}{2} nd(X+T)\left(1 - \frac{X+T}{D+t}\right) \quad (5)$$

with $$\rho_{\max.} = \text{arc } \cos \frac{X+T}{D+t} \quad (6)$$

The number of protons escaping from the whole radiator depth is then $$N(E_0) = -\int_T^{D+t} \frac{1}{2} n\left(1 - \frac{X+T}{D+t}\right) d(X+T)$$

$$= -\frac{1}{4} n \frac{1}{D+t}[(D+t) - T]^2 \quad (7)$$

If there are protons with different original energies present, then there are $dN(E_0)$ protons in the energy interval $dE_0$ and 7 becomes $$dN(E_0) = -\frac{1}{4} dn \frac{1}{D+t}[(D+t) - T]^2 \quad (8)$$

If the protons are produced by monoenergetic neutrons of energy $E_n$, the recoil proton spectrum at the point of its origin has a constant amplitude in $0 \leq E_0 \leq E_n$ and it is zero elsewhere. $dn$ is then proportional to the width of the corresponding energy interval $\Delta E_0$.

It can therefore be expressed as $$dn = C dE_0 = N_H A E_n{}^{-1} G(E_n) h(E_n) dE_0 \quad (9)$$

where $N_H$ is the concentration of hydrogen atoms in the scatterer,
A is the scatterer area,
$G(E_n)$ is the n, p scattering cross section,
and $h(E_n)$ is the flux of neutrons with the energy $E_n$ (monoenergetic).

To obtain the total number of recoil protons escaping to the detector we substitute 9 and 3 in 8 and integrate over $E_0$. Since only the negative values of the so obtained function are physically meaningful, this function is defined accordingly to expression 8 in the interval where its value is smaller than zero and has to be set zero everywhere else. The limits of integration are therefore $$E_0 = [TK(1-\delta) + E^{1-\delta}]^{\frac{1}{1-\delta}} = \bar{E}_0(E) \quad (10)$$

$$E_0 = E_n$$

and $$N = \frac{N_H A E_n{}^{-1} G(E_n) h(E_n)}{4K(1-\delta)} \int_{E_0 = \bar{E}_0(E)}^{E_n} F(E_0 E) dE_0 \quad (11)$$

with $$F(E_0 E) = \frac{[E_0{}^{1-\delta} - E^{1-\delta} - TK(1-\delta)]^2}{E_0{}^{1-\delta} - E^{1-\delta}} \quad (12)$$

By differentiation of 11 with respect to E we obtain the spectrum of recoil protons originating in the scatterer and escaping through the absorber of thickness T.

$$\frac{dN}{dE} = \frac{C}{4K(1-\delta)} \frac{\partial}{\partial E} \int_{E_o=\bar{E}_o(E)}^{E_n} F(E_o,E) dE_o \quad (13)$$

It can be shown using elementary calculus that in this case 11 and 12 applies $$\frac{\partial}{\partial E} \int_{E_o=\bar{E}_o(E)}^{E_n} F(E_o,E) dE_o = \int_{E_o=\bar{E}_o(E)}^{E_n} \frac{\partial}{\partial E} F(E_o,E) dE_o \quad (14)$$

with $$\frac{\partial E}{\partial E}(E_o,E) = (1-\delta)E^{-\delta}\left\{1 - \frac{T^2 K^2 (1-\delta)^2}{[E_o^{1-\delta} - E^{1-\delta}]^2}\right\} \quad (15)$$

Multiplying 13 by E, considering 14 and 15, and integrating the resulting expression we obtain the total energy delivered by the recoil protons to the detector located at the absorber.

As integration limits we choose the minimum and maximum proton energies which can contribute to the detector reading which are $E=o$ and $$E = E_n - [TK(1-\delta)]^{\frac{1}{1-\delta}}$$

$$\epsilon = \int_0^{E_n-[TK(1-\delta)]^{\frac{1}{1-\delta}}} \frac{dN}{dE} E\, dE = \frac{C}{4K(1-\delta)} \int_0^{E_n-[TK(1-\delta)]} E\left[\int_{E_o=\bar{E}_o(E)}^{E_n} \frac{\partial F}{\partial E}(E_o, E)\right] dE_o \quad (16)$$

The Expression 16 applies in the case of monoenergetic neutrons.

In the case of a neutron spectrum with the spectral distribution $h(E_n)$ we subdivide the spectrum into intervals of the width $\Delta E_n$ where $\Delta E_n$ may be variable. Within each $\Delta E_n$ all neutrons can be considered monoenergetic. There are $h(E_n)\Delta E_n$ neutrons in each interval and if one has available $k$ detector elements with different absorber thicknesses one can use Expression 16 for each of them. Therefore for the delivery rate of the energy which can be observed with a detector belonging to an element whose absorber thickness is $T_i$ we obtain $$\epsilon(T_i) = \Delta E_1 h(E_1) A_1 + \ldots + \Delta E_K h(E_K) A_{iK}$$
$$i = 1, 2, \ldots k \quad (17)$$

where $E_K$ represents the highest neutron energy in the spectrum.

The constants $A_{ij}$ are given by the Expression 16 and are $$A_{ij} = \frac{G(E_j) A N_H}{4K(1-\delta) E_j} \int_{E=0}^{E_j-[T_i K(1-\delta)]^{\frac{1}{1-\delta}}} E\left[\int_{E_o=\bar{E}(E)}^{E_j} \frac{\partial F}{\partial E}(E_o,E) dE_o\right] dE \quad (18)$$

$E_j$ is the energy in the center of the interval $\Delta E_j$. Since we have available $k$ equations of the type 17 we can compute every $h(E_j)\Delta E_j$. To evaluate the system in the case where we intend to measure the number of protons escaping from the absorber per unit time as a function of time, we return to Expressions 11 and 12. Integrating 11 we obtain $$N = \frac{1}{4} \frac{C}{K(1-\delta)} \int_0^{E_n-[TK(1-\delta)]^{\frac{1}{1-\delta}}} \left[\int_{E_o=\bar{E}_o(E)}^{E_n} \frac{\partial F}{\partial E}(E_o, E) dE_o\right] dE \quad (19)$$

where $$\frac{\partial F}{\partial E}(E_o, E)$$

is given by 15

From analogous considerations like those following 12 we obtain $$N(T_i) = \Delta E_1 h(E_1) B_{i1} + \ldots + \Delta E_K h(E_K) B_{iK} \quad (20)$$
$$i = 1, 2, \ldots K$$

where the constants $B_{ij}$ are $$B_{ij} = \frac{G(E_j) A N_H}{4K(1-\delta) E_j} \int_{E=0}^{E_j-[T_i K(1-\delta)]^{\frac{1}{1-\delta}}} \left[\int_{E_o=\bar{E}(E)}^{E_j} \frac{\partial F}{\partial E}(E_o,E) dE_o\right] dE \quad (21)$$

$N(T_i)$ is the total number of protons reaching the detector per unit of time, which can be measured experimentally. Again we can solve the linear system for the $h(E_j)$ which gives us the neutron spectrum.

A.—Evaluation of the neutron spectrum

In the previous section we showed that the fast neutron intensity at the energy $E_l$ within the energy interval $\Delta E_l$ can be obtained from the recorded data for one particular time $t$ by evaluating the expression $$h(E_l)\Delta E_l = \frac{\begin{vmatrix} a_{11} & \ldots & a_{1l-1} i_1 a_{1l+1} & \ldots & a_{1K} \\ a_{K1} & \ldots & & i_K & & a_{KK} \end{vmatrix}}{\begin{vmatrix} a_{11} & \ldots & a_{1k} \\ a_{K1} & \ldots & a_{KK} \end{vmatrix}} \quad (22)$$

regardless of whether the applied method is the measurement of the total number of recoil protons, or the total energy of recoil protons escaping through a set of absorbers with thicknesses $T_1 \ldots T_K$. Here $A_{ij}$ are instrument constants which can be computed or determined by means of a laboratory experiment at very low neutron rates (single counts) using a monoenergetic neutron source. The $i_1(t) \ldots i_k(t)$ are the output currents or counting rates recorded through the detectors 1 through $k$ at a particular instant of time. They represent either the proton current or the integral proton energy as a function of time. To obtain the neutron spectrum independent of a changing neutron flux one has to replace the currents $i_1 \ldots i_k$ by the numbers $$\frac{i_1}{i_1} \ldots \frac{i_k}{i_1}$$

Note that the value for $h(E_1)$ does not directly involve the spectral heights for energies higher or lower than $E_1$ and therefore $h(E_1)$ can be evaluated independently for each energy and for each instant of time.

The evaluation of the linear system 17 or 20 becomes very simple if the determinant $|aij|$ is triangular or $a_{ij}=0$ for $i>j$. The determinant can be obtained in this form by choosing the $k$ absorber thickness $T_i$ for each element so that each $T_i$ forms a special relationship with the selected energy intervals $\Delta Ej$ at the energies $Ej$. By selecting $T_i$ equal to the range of the proton of the energy $E_i$, only recoil protons which result from collisions with neutrons of an energy higher than $E_i$ can possibly contribute to the detector current; therefore, $aij=0$ for $i>j$. The range $T_i$ of protons with the energy $E_i$ can be obtained from Equation 2B by setting $t=T_i$, $E=0$ and $E_1=E_i$. Considering this choice for the absorber thicknesses we obtain for the constants $Aij$ and $Bij$ in the linear systems 17 and 20

$$A_{ij} = \frac{G(E_i)AN_H}{4KEj} \int_{E=0}^{Ej-E_i} E^{1-\delta} \left[ \int_{E_o=[E_i^{1-\delta}+E^{1-\delta}]}^{Ej} \frac{1}{1-\delta} \left\{ 1 - \left( \frac{E_i^{1-\delta}}{E_o^{1-\delta}-E^{1-\delta}} \right)^2 \right\} dE_o \right] dE \quad (23)$$

$$B_{ij} = \frac{G(E_i)AN_H}{4KEj} \int_{E_0}^{Ej-Ei} E^{-\delta} \left[ \int_{E_o=[E_i^{1-\delta}+E^{1-\delta}]}^{Ej} \frac{1}{1-\delta} \left\{ 1 - \left( \frac{E_i^{1-\delta}}{E_o^{1-\delta}-E^{1-\delta}} \right)^2 \right\} dE_o \right] dE \quad (24)$$

where $Aij=0$ and $Bij=0$ for $i>j$.

These are the final expressions for the evaluation of the spectroscope system in the case where the total energy of the recoil protons is measured, and for the case where the current or count rate of recoil protons is measured as a function of time.

B.—Energy resolution

The fast neutron energy resolution of the system is given by the number of intervals into which the energy is subdivided. This number is equal to the number of elements in the system. The number of elements is limited by the accuracy with which the absorbers can be made, by the fine structure of the recoil proton range, by how accurately the material constants which determine the values of $aij$ are known, and by the accuracy of the current measurement.

C.—Time resolution

The time resolution for neutron spectra detection is limited by the time resolution of the current detection system. Time resolutions of $10^{-9}$ seconds may be therefore obtained using fast oscilloscopes as current recorders at high neutron rates where the proton current method is applicable. The time between emission and collection of the recoil proton is of the order of $10^{-12}$ seconds and is, in all cases, negligible. In the other methods the time resolution is determined by the time constant of the detectors.

D.—Dose rate limitation

In practical application the version of the device in which the currents of the recoil protons are measured can work at any obtainable dose rate. The theoretical limitation is the space charge limitation according to the Langmuir formulas for the applicable geometry. The limiting current increases when the 3/2 power of the applied voltage. (I. Langmuir and K. T Compton, Rev. Mod. Phys. 3, 2, April 1931, p. 191.) Ref. 1.

The applied voltage is zero in our system so the mean energy of the recoil protons must be used instead. This energy is in a practical case of the order of 1 mev. There is approximately one recoil proton emitted for every 10,000 incident 2 mev. neutrons. Therefore the dose rate saturation according to Ref. 1 would take place at neutron fluxes of about $10^{26}$ neutrons per centimeter square per second. The other versions of the device will saturate with the saturation of the detecting mechanism. In case of the silicon diode or the ion chamber detector this takes place approximately at $10^{15}$ neutrons cm.$^{-2}$ sec.$^{-1}$. For the proton counting system the rate of incident neutrons of $10^9$ cm.$^{-2}$ sec.$^{-1}$ can be considered the allowable maximum.

E.—Computation of the sensitivity of the device

This can be computed from the formula given by Moyer, Ref. 2 (Moyer, B J. Nucleonics 10, No. 5, p. 14, May 1952). It gives the number of recoil protons leaving the surface of an hydrogenous material irradiated by fast neutrons:

$$N_p = 0.1 N_H A h(E_n) G_{np}(E_n) R(E_n) \quad (25)$$

where $N_H$ is the number of hydrogen atoms per cm.$^3$ of the irradiated material $h$, the flux neutrons with the energy $E_n$
$G_{np}$, scattering cross section
$R$, range of most energetic protons (cm.)
$A$, the area of the detector Substituting 2 mev. for the neutron energy and $5.10^{12}$ for $N_H$, one obtains as the sensitivity of an element in which proton currents are measured in which the absorber is very thin, and in which the emitter area is 1 cm.$^2$:

$$\approx 10^{-23} \text{ amp./neutron/sec.}$$

or $$\approx 2.5 \cdot 10^{-15} \text{ amp./rad./sec.}$$

From the Expression 22 one can also obtain the sensitivity of the device in which the recoil protons are counted individually as approximately $6.2 \cdot 10^{-5}$ counts per incident neutron cm.$^{-2}$ sec.$^{-1}$ for 2 mev. neutrons. In the case where the total energy of the recoil protons is measured we use a procedure outlined in Ref. 3. Ref. 3 (S. Kronenberg and H. Murphy, Radiation Research 12, 728, 1960).

Expression 14 in Ref. 3 gives the energy distribution of recoil protons escaping from the surface of a hydrogenous material irradiated with neutrons of the energy $E_n$. Multiplying this expression by the proton energy, integrating from zero to $E_n$ with respect to E, substituting for the maximum range of the protons $$\frac{E_n^{1-\delta}}{K(1-\delta)}$$

and considering Expression 25 we obtain for the total energy delivered to the detector $$\epsilon = N_p E_n \frac{1-\delta}{3-\delta} \quad (26)$$

where $N_p$ is given by the Expression 25 $E_n$ is the neutron energy, and $\delta$ is the material constant in 1A which has the typical value of $-0.7$. In the case of 2 mev. incident neutrons we obtain $57eV$ per incident neutron cm.$^{-2}$ sec.$^{-1}$ for the total energy delivered to the detector of an element with a very thin absorber and 1 cm.$^2$ area. Considering the efficiency of the detector, which is $\approx 32eV$ per ion pair for the ion chamber and $\approx 3eV$ per free charge produced in a typical solid state device, we obtain the sensitivity of the spectroscope element.

F.—*Monodirectional versus isotropic flux measurements*

The instrument in its form described so far is designed for measurement of neutrons with isotropic incidence. In the case where the neutrons are not isotropic but monodirectional, the above computation still is applicable as long as the instrument is constructed with a $4\pi$ geometry.

Operation of the system in a mixed environment of gammas and neutrons

To measure the neutron spectrum in a mixed neutron-gamma environment, the spectroscope should be insensitive to gammas. In the version of the device discussed so far, the gamma rays produce fast electrons in every element of the device which may contribute to the proton current, the ionization current or the photo-detector current. For the instruments with the intensity ranges between $10^{26}$–$10^{16}$ and $10^{16}$–$10^9$ neutrons cm.$^{-2}$ sec.$^{-1}$, one can apply a compensation method. Each element must be constructed as a double unit. One of them is the regular element, the other is constructed with the same geometry but the hydrogenous material is replaced by a non-hydrogenous material, preferably carbon (pure graphite). The thickness of the carbon must be chosen so that its absorption for gammas and its capability for fast electron production is the same as for the hydrogenous layer. The outputs of both elements caused by gamma radiation are then almost equal, and if the outputs are connected so that the currents have the tendency of canceling each other, the device becomes, to a high degree, gamma insensitive.

FIG. 7 shows such a circuit for an element pair where non-hydrogenous scintillators are used as detectors.

In the case of a system which works on the principle of counting single protons, the gamma insensitivity can be obtained without compensation when we use a solid state ion chamber as detector. The sensitive element in such a detector is the depletion layer in the silicon. When we choose crystals with the depth of the depletion layer equal to the average range of the recoil protons with maximum energy the electrons will give only very small pulses since their specific ionization is very small. We can avoid counting these low pulses by setting the discriminator level, with which most commercially available pulse counters are equipped, to a proper level. We have worked with this method at an intensity ratio of $10^{-4}$ $$\frac{n \text{ cm.}^{-2} \text{ sec.}^{-1}}{\delta \text{ cm.}^{-2} \text{ sec.}^{-1}}$$

without noticing a contribution to the pulse counts from the gammas.

What is claimed is:

1. A spectroscope for measuring neutron energy spectra as a function of time within a wide intensity range comprising a plurality of elements to be simultaneously exposed to the environment to be explored, each of said elements having a body of hydrogenous material with which the incident neutrons react to release protons having energies bearing a relationship to the energy of the incident neutrons, an absorbing means for each element in close proximity to the hydrogenous material each absorbing means having different absorption characteristics to said protons and acting to absorb a different portion of the protons reaching it and passing the remaining protons, and separate means for each element to measure the proton flux passing the absorbing means for each element whereby the data thus obtained from the detectors can be interpreted mathematically in terms of the energy spectrum of the incident neutron environment as a function of time for the neutron intensity range from $10^{26}$ to $10^{16}$ neutrons cm.$^{-2}$ sec.$^{-1}$.

2. A spectroscope for measuring neutron energy spectra as a function of time according to claim 1 and wherein said detecting and measuring means is designed to measure the total energy of the recoil protons delivered to the detector elements as a function of time whereby the data thus obtained from the detectors can be interpreted in terms of the energy spectrum of the incident neutron environment as a function of time for the neutron intensity range from $10^{16}$ to $10^9$ neutrons cm.$^{-2}$ sec.$^{-1}$.

3. A spectroscope for measuring neutron energy spectra as a function of time comprising a plurality of elements to be simultaneously exposed to the environment explored, each of said elements comprising a body of plastic material containing hydrogen with which the incident neutrons react to release recoil protons having energies bearing a relation to the energy of the incident neutrons, a metallic absorbing means of cylindrical geometry surrounding the plastic material for each element, each absorbing means being a sheet of material of uniform thickness the sheet for each element having different thickness and functioning to absorb different fractions of the protons reaching it and passing the remaining protons, a metallic detector of $4\pi$ geometry surrounding each absorber and electrically insulated therefrom, said detector having the capacity for absorbing all protons reaching its surface and readout means for each element connected between said absorbing means and said detector operable to measure the current due to the charges of the protons passing the absorbers for each element whereby the data from the detectors can be interpreted mathematically in terms of the energy spectrum of the incident neutron environment as a function of time for neutron intensities in the operating range from $10^{26}$ to $10^{16}$ neutrons cm.$^{-2}$ sec.$^{-1}$.

4. A spectroscope for measuring neutron spectra as a function of time according to claim 3 and wherein the said absorbing means is of spherical geometry.

5. A spectroscope for measuring neutron energy spectra as a function of time according to claim 3 and wherein the said readout means is operable to indicate the total proton energy delivered to said detectors as a function of time whereby the data thus obtained from the detectors can be mathematically interpreted in terms of the energy spectrum of the incident neutron environment as a function of time for the neutron intensity operating range from $10^{16}$ to $10^9$ neutrons cm.$^{-2}$ sec.$^{-1}$.

6. A spectroscope according to claim 3 and wherein the said readout means indicates total proton flux delivered to said detectors.

7. A spectroscope for measuring neutron energy spectra as a function of time according to claim 5 and wherein the said detectors are a solid state device connected to said readout device wherein the said readout is operable to measure the proton energy spectra delivered to said detector as a function of time whereby the data thus obtained from the detectors can be mathematically interpreted in terms of the energy spectrum of the incident neutron environment as a function of time for neutron intensities ranging from $10^{16}$ to $10^2$ neutrons cm.$^{-2}$ sec.$^{-1}$.

8. A spectroscope for measuring neutron energy spectra as a function of time comprising a plurality of elements to be simultaneously exposed to the environment explored, each of said elements comprising a body of plastic material containing hydrogen with which the incident neutrons react to release recoil protons having energies bearing a relationship to the energy of the incident neutrons, a metallic absorber for each element close to the plastic body in each absorber consisting of a sheet of material of uniform thickness the sheet for each element having a different thickness and functioning to absorb different fractions of the energy and number of the protons reaching it and passing the remaining fractions, surrounding each absorber with a chamber containing ionizable gas, and means to measure the ionization current from said gas as a function of time for each absorber due to the protons reaching said chamber whereby the ionization current from each chamber can be interpreted mathematically in terms of the energy spectrum of the incident neutron environment as a function of time for neutron intensities ranging from $10^{16}$ to $10^9$ neutrons cm.$^{-2}$ sec.$^{-1}$.

9. A spectroscope for measuring neutron energy spectra as a function of time according to claim 8 and wherein the said absorbers are surrounded by a phosphor and means to measure the light output of the phosphor due to the protons passing the absorber as a function of time for each element whereby the light output from each element can be mathematically interpreted in terms of the energy spectrum of the incident neutron environment as a function of time for neutron intensities ranging from $10^{16}$ to $10^2$ neutrons cm.$^{-2}$ sec.$^{-1}$.

10. A spectroscope for measuring energy spectra as a function of time comprising a plurality of elements to be simultaneously exposed to the environment to be explored each of said elements comprising a first and a second unit, said first unit comprising a body of hydrogenous plastic with which the incident neutrons react to release recoil protons having energies bearing a relationship to the energy of the incident neutrons, an absorber for each first unit adjacent said plastic body consisting of a sheet of metal of uniform thickness each absorber having a different thickness acting to absorb a different portion of the protons reaching it and passing the remaining protons, a detecting means for each first unit which receives all protons passed by the absorbers and readout means connected to each detector, said second units having the same geometry as said first units and comprising a body of non-hydrogenous low Z material, a metallic absorber adjacent the non-hydrogenous material, detecting means adjacent said absorber connected to said readout means, said body of non-hydrogenous material being of a thickness to provide absorption of gamma rays, production of beta rays and absorption of beta rays equal to that of the hydrogenous plastic in said first units and means to combine the outputs of both units so that the outputs from each pair of units due to gamma rays will oppose each other making the spectroscope insensitive to gamma rays while still sensitive to neutrons.

11. A spectroscope for measuring energy spectra as a function of time according to claim 10 and wherein the detectors in said units are replaced by scintillators and wherein light from the scintillators is piped to light detectors through glass rods adjacent the scintillators and a recorder connected to the light detectors for each pair of units acting to measure the difference between the outputs as a function of time.

12. A spectroscope for measuring neutron energy as a function of time according to claim 1 and wherein the said readout means is operable to indicate the proton flux as a function of time by means of counting the number of protons escaping the said absorbing means per unit of time as a function of time whereby the data thus obtained from the detectors can be mathematically interpreted in terms of the energy spectrum of the incident neutron environment as a function of time for the neutron intensity range from $10^9$ to $10^2$ neutrons cm. $^{-2}$ sec.$^{-1}$.

References Cited by the Examiner

UNITED STATES PATENTS

| | | | |
|---|---|---|---|
| 2,616,052 | 10/1952 | Hurst | 250—83.1 |
| 2,683,221 | 7/1954 | Gossick | 250—83.1 X |
| 2,867,727 | 1/1959 | Welker et al. | 250—83.1 |
| 2,920,204 | 1/1960 | Youmans | 250—83.1 |

RALPH G. NILSON, *Primary Examiner.*

ARCHIE R. BORCHELT, *Examiner.*